(12) United States Patent
Takayama et al.

(10) Patent No.: US 8,488,914 B2
(45) Date of Patent: Jul. 16, 2013

(54) ELECTRONIC APPARATUS AND IMAGE PROCESSING METHOD

(75) Inventors: Shunsuke Takayama, Tachikawa (JP); Kohei Momosaki, Mitaka (JP); Kouetsu Wada, Nishitama-gun (JP); Kenichi Tabe, Ome (JP); Tomonori Sakaguchi, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 116 days.

(21) Appl. No.: 13/116,786

(22) Filed: May 26, 2011

(65) Prior Publication Data

US 2011/0305395 A1    Dec. 15, 2011

(30) Foreign Application Priority Data

Jun. 15, 2010 (JP) ................................. 2010-136534

(51) Int. Cl.
*G06K 9/54* (2006.01)

(52) U.S. Cl.
USPC ........................................................ 382/305

(58) Field of Classification Search
USPC ....... 382/190, 305; 386/235–262; 700/1–206; 715/200–267; D14/125–137, 496–511
See application file for complete search history.

(56) References Cited

U.S. PATENT DOCUMENTS

| | | |
|---|---|---|
| 7,657,157 B2 | 2/2010 | Okabayashi et al. |
| 2005/0237579 A1 | 10/2005 | Gohara et al. |
| 2005/0238322 A1 | 10/2005 | Gohara et al. |
| 2006/0126963 A1 | 6/2006 | Sonoda et al. |
| 2008/0155422 A1 | 6/2008 | Manico et al. |
| 2008/0235584 A1 | 9/2008 | Masham |
| 2009/0199117 A1 * | 8/2009 | Yamamoto et al. ........... 715/764 |

FOREIGN PATENT DOCUMENTS

| | | | |
|---|---|---|---|
| JP | 2005-204021 | * | 7/2005 |
| JP | 2005-303907 | | 10/2005 |
| JP | 2005-340987 | * | 12/2005 |
| JP | 2006-166208 | * | 6/2006 |
| JP | 2010-81305 | | 6/2006 |
| JP | 2008-124666 | | 5/2008 |
| JP | 2009-81733 | | 4/2009 |
| JP | 2009-188761 | * | 8/2009 |
| JP | 2006-140559 | | 4/2010 |
| JP | 2010-081305 | * | 4/2010 |
| JP | 2010-514056 | | 4/2010 |
| JP | 2010514056 | * | 4/2010 |
| WO | 2008/079286 A1 | | 7/2008 |

OTHER PUBLICATIONS

Japanese Patent Application No. 2010-136534; Notice of Reasons for Rejection; Mailed Oct. 4, 2011 (with English translation).*
Japanese Patent Application No. 2010-136534; Final Notice of Rejection; Mailed Jan. 10, 2012 (with English translation).*

* cited by examiner

*Primary Examiner* — Gregory F Cunningham
(74) *Attorney, Agent, or Firm* — Blakely, Sokoloff, Taylor & Zafman LLP

(57) ABSTRACT

According to one embodiment, an electronic apparatus includes an indexing module, a select module, a first image extraction module and a playback module. The indexing module is configured to generate index information indicative of attributes of a plurality of still images. The select module is configured to select a style. The first image extraction module is configured to extract a first still image group from the plurality of still images corresponding to the style, based on the index information. The playback module is configured to play back a moving picture by using the first still image group.

11 Claims, 14 Drawing Sheets

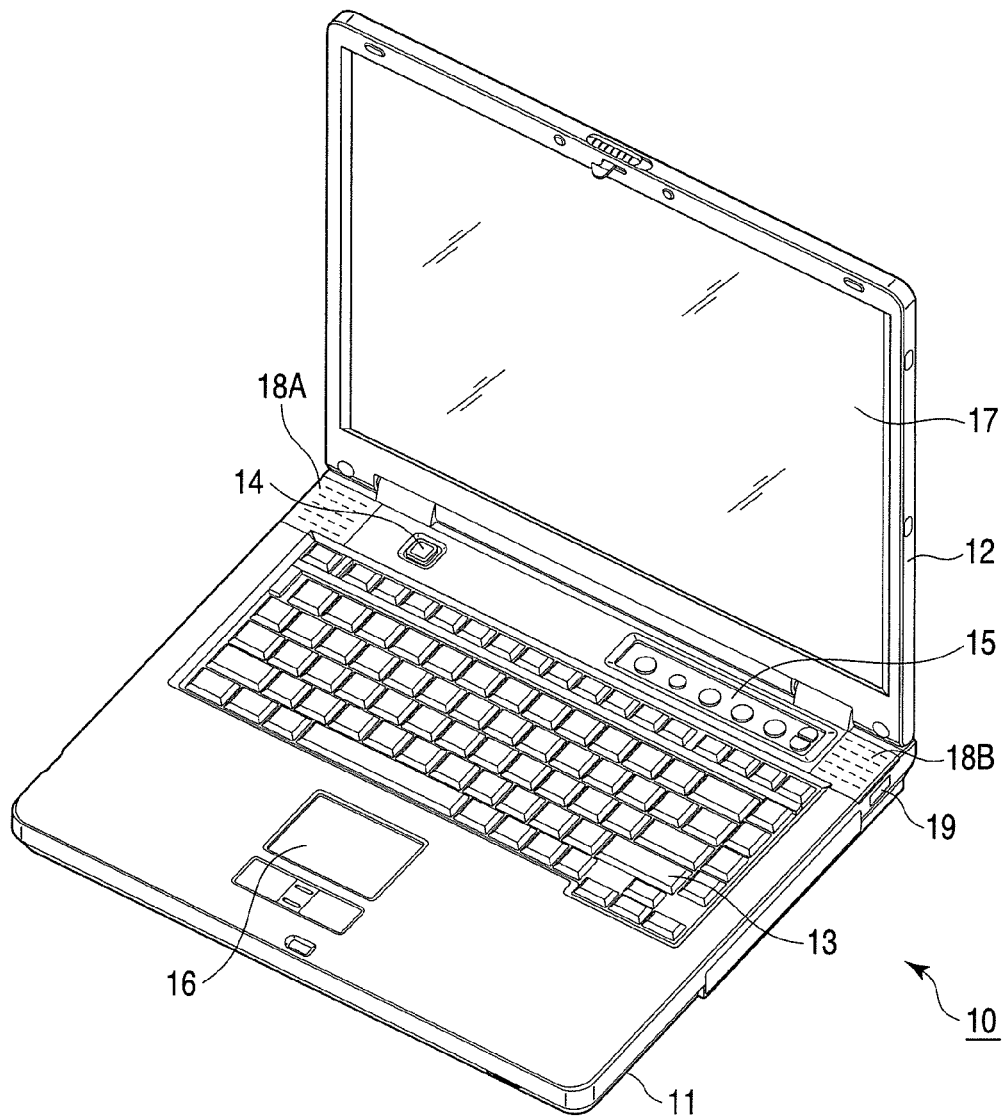
F I G. 1

| Image ID | Date/time of generation | Location of generation | Event ID | Smile degree | Number of persons | Face image information (1) ||||||| |
|---|---|---|---|---|---|---|---|---|---|---|---|---|
| | | | | | | Face image | Person ID | Position | Size | Smile degree | Sharpness | Frontality |
| 000 | ... | ... | ... | ... | ... | ... | ... | ... | ... | ... | ... | ... |
| 001 | ... | ... | ... | ... | ... | ... | ... | ... | ... | ... | ... | ... |
| 002 | ... | ... | ... | ... | ... | ... | ... | ... | ... | ... | ... | ... |
| 003 | ... | ... | ... | ... | ... | ... | ... | ... | ... | ... | ... | ... |
| 004 | ... | ... | ... | ... | ... | ... | ... | ... | ... | ... | ... | ... |
| ... | | | | | | | | | | | | |

302A

F I G. 4

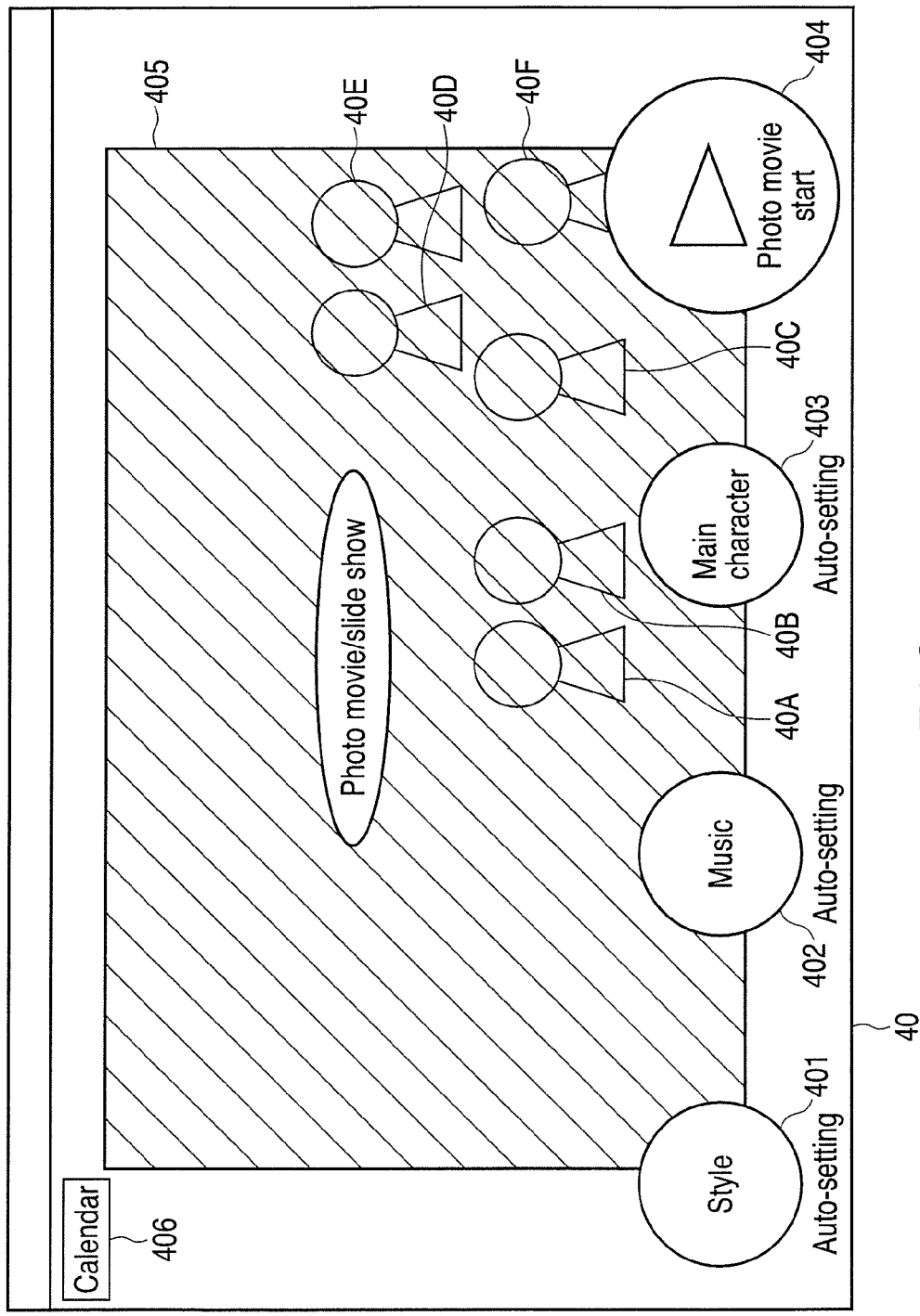
F I G. 5

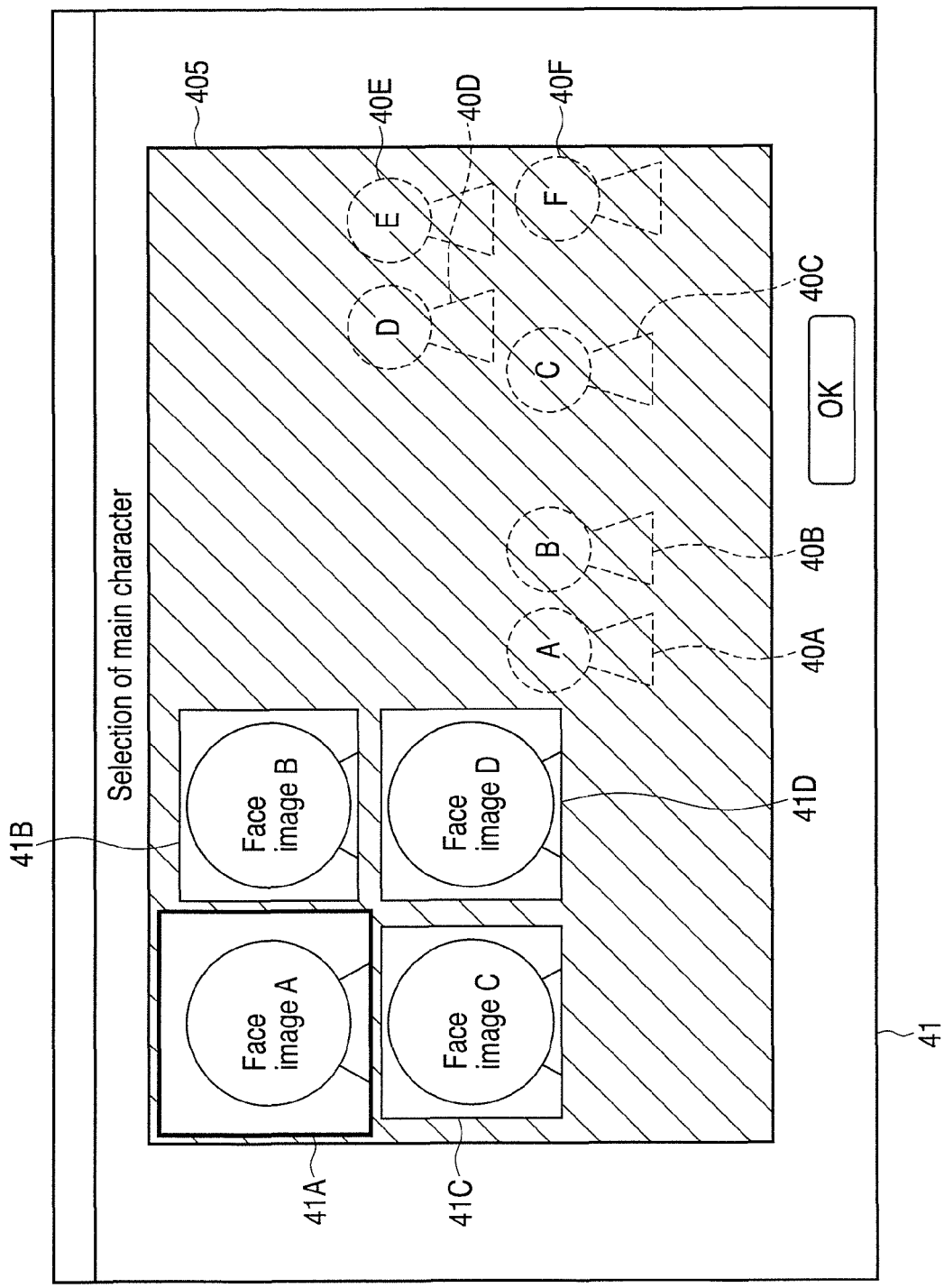
F I G. 6

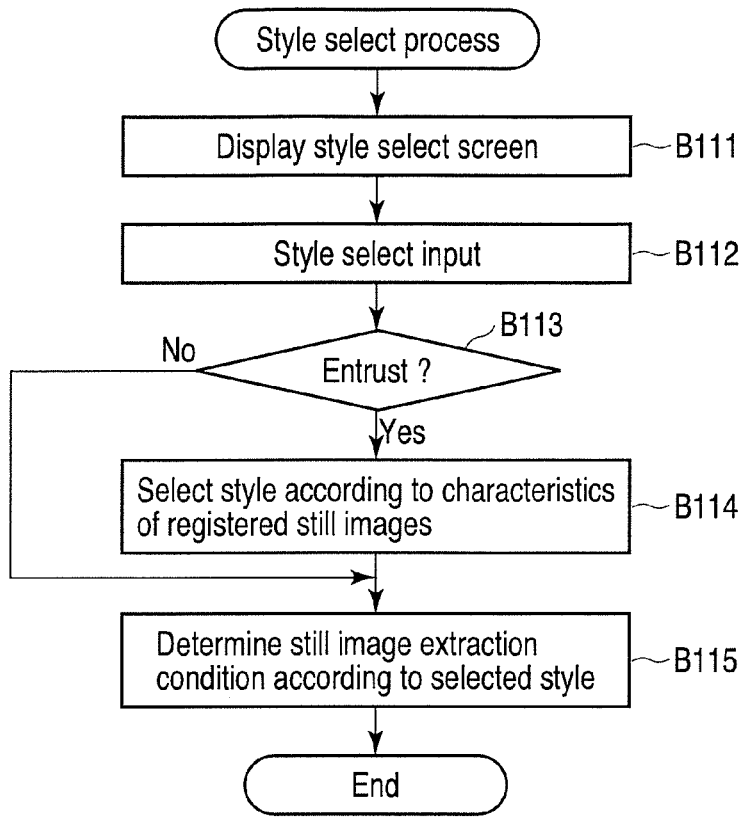

FIG. 10

| Style | Image extraction condition |
|---|---|
| Happy | High smile degree<br>Many persons |
| Party | Same date of generation<br>Many persons |
| Travel | Consecutive dates of generation<br>Different locations |
| Biography | Dates of generation over two or more years<br>Specific person (including protagonist) |
| Ceremonial | Same date of generation<br>Many persons, low smile degree |
| Cool | Few persons<br>Low smile degree |
| | |

FIG. 11

| Style | Scenario | | | | |
|---|---|---|---|---|---|
| | Number of images | Effect | Music | ------- | ------- |
| Happy | ------- | Floral design | ------- | ------- | ------- |
| Party | ------- | Floral design, 9-multi-screen | ------- | ------- | ------- |
| Travel | ------- | Film roll | ------- | ------- | ------- |
| Biography | ------- | Sepia Zoom | ------- | ------- | ------- |
| | ------- | | ------- | ------- | ------- |

F I G. 1 3

ELECTRONIC APPARATUS AND IMAGE PROCESSING METHOD

CROSS-REFERENCE TO RELATED APPLICATIONS

This application is based upon and claims the benefit of priority from Japanese Patent Application No. 2010-136534, filed Jun. 15, 2010; the entire contents of which are incorporated herein by reference.

FIELD

Embodiments described herein relate generally to an electronic apparatus which displays an image, and an image processing method.

BACKGROUND

In recent years, various electronic apparatuses, such as a personal computer, a digital camera and a PDA, have been gaining in popularity. Such an electronic apparatus has a function of managing still images such as photos. As an image management method, there is known a method of classifying photos into a plurality of groups, for example, based on date/time data which is added to the photos.

In addition, recently, attention has been paid to a moving picture creation technique for creating a moving picture (e.g. photo movie, slide show, etc.) by using still images such as photos. As the moving picture creation technique, for example, there is known a technique wherein still images are classified into a plurality of directories corresponding to a plurality of dates/times of imaging and are stored, and a moving picture is created by using still images in a directory designated by a user.

In an electronic apparatus which displays a slide show, for example, characteristic amounts of images which are stored are extracted, and the images are classified by using the characteristic amounts, based on the relationship between psychological information and physical information. In accordance with the designation of the combination of the psychological information and physical information, corresponding images are selected and a slide show is played back.

However, in the method in which images are classified in advance by using characteristic amounts of the images and a slide show is displayed by designating the classification, the still images which are displayed are limited to the still images in the designated classification. It is thus difficult to present to the user a moving picture including unexpected still images (still images, of which the user is unaware), or still images which are not stored in the same directory but have high relevance.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is an exemplary perspective view showing the external appearance of an electronic apparatus according to an embodiment.

FIG. 4 is an exemplary view showing an example of index information which is used by the photo movie creation application program which is executed by the electronic apparatus of the embodiment.

FIG. 5 is an exemplary view showing an example of a main screen which is displayed by the electronic apparatus of the embodiment.

FIG. 6 is an exemplary view showing an example of a key image select screen which is displayed by the electronic apparatus of the embodiment.

FIG. 10 is an exemplary flowchart illustrating an example of a style select process which is executed by the electronic apparatus of the embodiment.

FIG. 11 is an exemplary view showing examples of image extraction conditions for individual styles in the embodiment.

FIG. 13 is an exemplary view showing examples of effects in the electronic apparatus of the embodiment.

DETAILED DESCRIPTION

Figure 2:
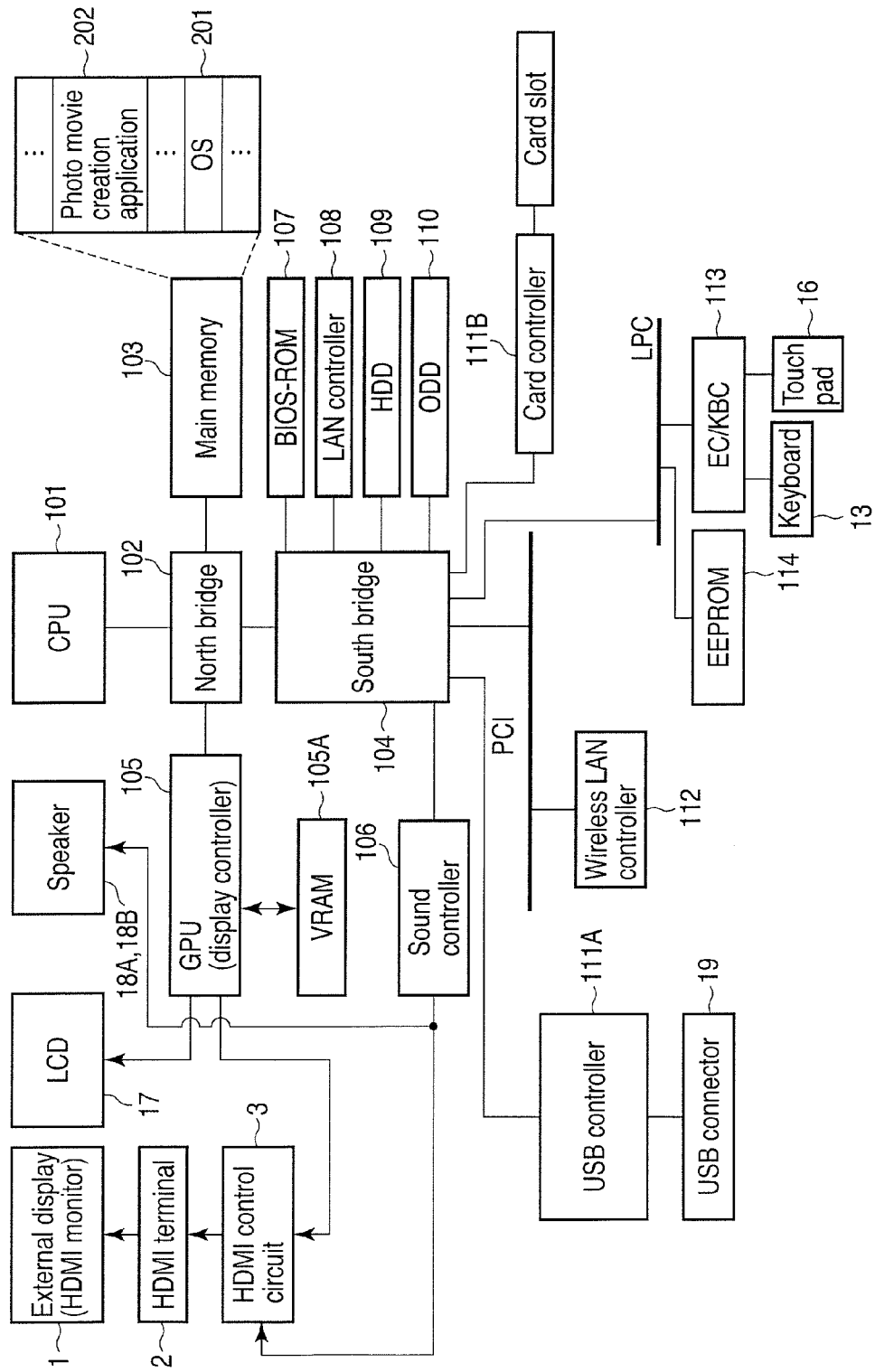
FIG. 2 is an exemplary block diagram showing the system configuration of the electronic apparatus of the embodiment.

Various embodiments will be described hereinafter with reference to the accompanying drawings.

In general, according to one embodiment, an electronic apparatus comprises an indexing module, a select module, a first image extraction module, and a playback module. The indexing module is configured to generate index information indicative of attributes of a plurality of still images. The select module is configured to select a style. The first image extraction module is configured to extract a first still image group from the plurality of still images corresponding to the style, based on the index information. The playback module is configured to play back a moving picture by using the first still image group.

FIG. 1 is an exemplary perspective view showing the external appearance of an electronic apparatus according to an embodiment. The electronic apparatus is realized, for example, as a notebook-type personal computer 10. As shown in FIG. 1, the computer 10 comprises a computer main body 11 and a display unit 12. An LCD (liquid crystal display) 17 is built in the display unit 12. The display unit 12 is attached to the computer main body 11 such that the display unit 12 is rotatable between an open position where the top surface of the computer main body 11 is exposed, and a closed position where the top surface of the computer main body 11 is covered.

The computer main body 11 has a thin box-shaped housing. A keyboard 13, a power button 14 for powering on/off the computer 10, an input operation panel 15, a touch pad 16, and speakers 18A and 18B are disposed on the top surface of the housing of the computer main body 11. Various operation buttons are provided on the input operation panel 15.

The right side surface of the computer main body 11 is provided with a USB connector 19 for connection to a USB cable or a USB device of, e.g. the USB (universal serial bus) 2.0 standard. In addition, an external display connection terminal (not shown), which supports, e.g. the HDMI (high-definition multimedia interface), is provided on the rear surface of the computer main body 11. The external display connection terminal is used to output a digital video signal to an external display.

FIG. 2 is an exemplary view showing the system configuration of the computer 10.

The computer 10, as shown in FIG. 2, includes a CPU (central processing unit) 101, a north bridge 102, a main memory 103, a south bridge 104, a GPU (graphics processing unit) 105, a VRAM (video random access memory) 105A, a sound controller 106, a BIOS-ROM (basic input/output system-read only memory) 107, a LAN (local area network) controller 108, a hard disk drive (HDD) 109, an optical disc drive (ODD) 110, a USB controller 111A, a card controller 111B, a wireless LAN controller 112, an embedded controller/keyboard controller (EC/KBC) 113, and an EEPROM (electrically erasable programmable ROM) 114.

The CPU 101 is a processor for controlling the operations of the respective components in the computer 10. The CPU 101 executes an operating system (OS) 201 and various application programs, such as a photo movie creation application program 202, which are loaded from the HDD 109 into the main memory 103. The photo movie creation application program 202 is software which plays back various digital contents which are stored in, e.g. the HDD 109. The photo movie creation application program 202 has a moving picture generation function. The moving picture generation function is a function of creating a moving picture (slide show (first moving picture), photo movie (second moving picture)) by using materials (digital contents) such as still images stored in, e.g. the HDD 109. Further, the moving picture generation function includes a function of analyzing the materials which are used for the moving picture. The photo movie creation application program 202 plays back the moving picture which is created by using the materials, and displays the moving picture on the screen (LCD 17).

The CPU 101 executes a BIOS that is stored in the BIOS-ROM 107. The BIOS is a program for hardware control.

The north bridge 102 is a bridge device which connects a local bus of the CPU 101 and the south bridge 104. The north bridge 102 includes a memory controller which access-controls the main memory 103. The north bridge 102 also has a function of communicating with the GPU 105 via, e.g. a PCI EXPRESS serial bus.

The GPU 105 is a display controller which controls the LCD 17 that is used as a display monitor of the computer 10. A display signal, which is generated by the GPU 105, is sent to the LCD 17. In addition, the GPU 105 can send a digital video signal to an external display 1 via an HDMI control circuit 3 and an HDMI terminal 2.

The HDMI terminal 2 is the above-described external display connection terminal. The HDMI terminal 2 is capable of sending a non-compressed digital video signal and a digital audio signal to the external display 1, such as a TV, via a single cable. The HDMI control circuit 3 is an interface for sending a digital video signal to the external display 1, which is called "HDMI monitor", via the HDMI terminal 2.

The south bridge 104 controls devices on a PCI (peripheral component interconnect) bus and devices on an LPC (low pin count) bus. The south bridge 104 includes an IDE (integrated drive electronics) controller for controlling the HDD 109 and ODD 110. The south bridge 104 also has a function of communicating with the sound controller 106.

The sound controller 106 is a sound source device and outputs audio data, which is a playback target, to the speakers 18A and 18B. The LAN controller 108 is a wired communication device which executes wired communication of, e.g. the IEEE 802.3 standard. On the other hand, the wireless LAN controller 112 is a wireless communication device which executes wireless communication of, e.g. the IEEE 802.11g standard. The USB controller 111A communicates with an external device which supports, e.g. the USB 2.0 standard (the external device is connected via the USB connector 19). For example, the USB controller 111A is used in order to receive an image data file which is stored in, for example, a digital camera. The card controller 111B executes data write and data read in/from a memory card such as an SD card, which is inserted in a card slot provided in the computer main body 11.

The EC/KBC 113 is a one-chip microcomputer in which an embedded controller for power management and a keyboard controller for controlling the keyboard 13 and touch pad 16 are integrated. The EC/KBC 113 has a function of powering on/off the computer 10 in accordance with the user's operation of the power button 14.

Figure 3:
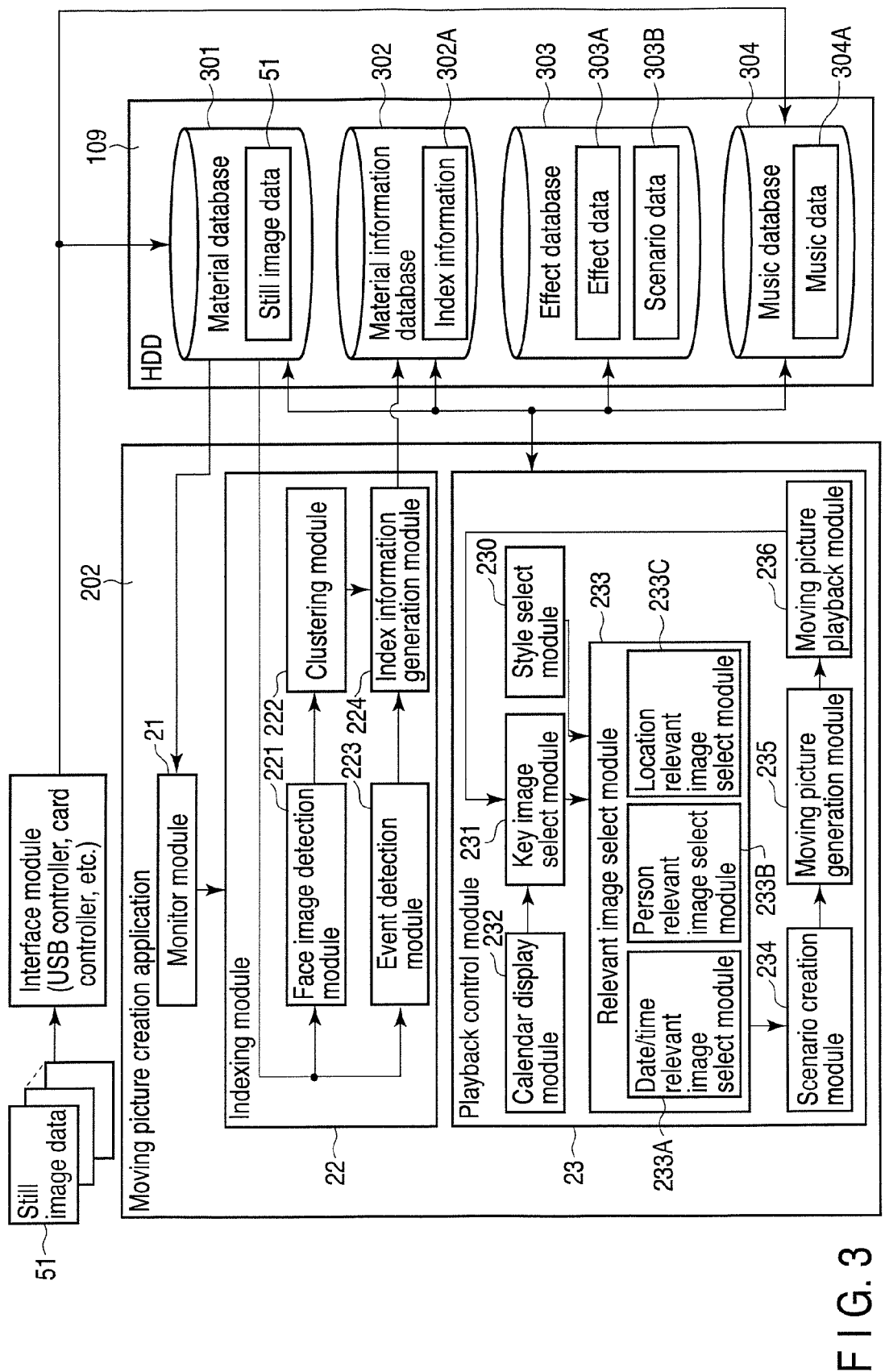
FIG. 3 is an exemplary block diagram showing the functional structure of a photo movie creation application program which is executed by the electronic apparatus of the embodiment.

Next, referring to FIG. 3, a functional structure of the photo movie creation application program 202 is described.

A description is given of a structure example for realizing a moving picture generation function, which is one of the functions of the photo movie creation application program 202. The moving picture generation function is a function for creating a moving picture (e.g. photo movie, slide show) by using still images (still image data) 51 stored in a predetermined directory (folder) in the HDD 109, and playing back the created moving picture. The still images 51 are, for instance, digital photos, or other various still image files (e.g. JPEG (Joint Photographic Experts Group) files). The term "photo movie" refers to a moving picture (movie) which is generated by using still images (e.g. photos). In the playback of the photo movie, various effects or transitions are applied to the still images. The still images, to which the effects or transitions have been applied, are played back together with music. The photo movie creation application program 202 can automatically extract still images which are relevant to a certain still image (key image), and can create and play back the photo movie by using the extracted still images. The term "slide show" refers to a moving picture (movie) which successively displays the still images one by one.

The photo movie creation application program 202 monitors the folder (photo folder) in the HDD 109, which is set by the user. If the photo movie creation application program 202 detects that one or more new still images (photo files) have been stored in the photo folder, the photo movie creation application program 202 executes indexing of the one or more new still images and, at the same time, starts a slide show of the one or more new still images. If the indexing is completed, the photo movie creation application program 202 creates a photo movie based on the one or more new still images, and plays back the created photo movie. In this case, for example, a photo movie may be created from only the one or more new still images, and the created photo movie may be played back. Alternatively, still images relevant to the one or more new still images may be extracted from the still images in the photo folder, a photo movie may be created by using the one or more new still images and the extracted still images, and the photo movie may be played back.

The creation of the photo movie is executed based on one still image (key image). Specifically, still images comprising a plurality of still images relevant to a selected key image are automatically extracted, and a photo movie is created by using the extracted still images. Each of a style, music and a person (face) of interest can be designated as a condition for creating a photo movie. According to the selected style, a still image extraction method (image extraction condition) according to the style and an effect/transition to be used are determined. In the prior art, photos which are used in creating a movie are designated by the user. On the other hand, the photo movie creation application program 202 automatically extracts photos, which are to be used, from all still images in the photo folder. Thereby, unexpected photos can be found and shown to the user.

In the description of the embodiment, it is assumed that the style is selected. However, one of choices using other expressions, such as a theme, a keyword and a genre, by which the user can understand concepts, may be selected.

In the extraction process, photos with better photographic quality may be extracted according to the smile degree of face images, the sharpness of face images, etc. In addition, a person corresponding to each face image may be recognized by face clustering, and it is possible to extract, for example, photos including face images of the selected person, or photos including face images of another person who has relevance to the selected person. Furthermore, photos may be classified into a plurality of events by using an event grouping technique. In this case, the relevance between events may be estimated based on the relationship between appearing persons in a certain event and appearing persons in another event, and the result of estimation may be used in the extraction process. For example, events in which the same person appears may be estimated to be relevant. For example, the frequency (co-occurrence frequency), with which a person A and another person B appear in the same photo, is high, it may be estimated that an event, to which a photo including the person A belongs, is relevant to an event to which a photo including the person B belongs.

The photo movie creation application program 202 includes a monitor module 21, an indexing module 22 and a playback control module 23.

The monitor module 21 monitors the material database 301 in the HDD 109 at all times, and determines whether a new still image 51 has been stored in the material database 301 in the HDD 109 via an interface module such as the USB controller 111A or card controller 111B. The material database 301 corresponds to a predetermined directory (the above-described photo folder) in the HDD 109. The still image 51 stored in the material database 301 is used as a material candidate of a moving picture (photo movie, slide show). Not only the still images 51, but also a moving picture, such as a short movie, may be stored as a material candidate in the material database 301.

The indexing module 22 analyzes the still images 51 in the material database 301, and generates index information indicative of an attribute of each of the still images 51. The indexing by the indexing module 22 is started, for example, triggered by the storage of one or more new still images (photo files) in the material database 301. In other words, when one or more new still images have been stored in the material database 301, the indexing module 22 generates the index information corresponding to the new still image(s).

The indexing module 22 has a face recognition function. The index information also includes a recognition result of face images included in the still images 51.

The indexing module 22 includes a face image detection module 221, a clustering module 222, an event detection module 223 and an index information generation module 224.

The face image detection module 221 detects a face image from the still image 51 that is a target of indexing (e.g. a still image newly stored in the photo folder). The face image can be detected, for example, by analyzing the features of the still image 51 and searching for a region having a feature similar to a face image feature sample which is prepared in advance. The face image feature sample is characteristic data which is obtained by statistically processing face image features of many persons. By the face detection process, the region corresponding to the face image included in the still image 51 is detected, and the position (coordinates) and size of the region are detected.

In addition, the face image detection module 221 analyzes the detected face image. The face image detection module 221 calculates, for example, the smile degree, sharpness, frontality, etc. of the detected face image. The smile degree is an index indicative of the degree of a smile of the detected face image. The sharpness is an index indicative of the degree of sharpness of the detected face image (e.g. non-blurredness). The frontality is an index indicative of the degree at which the detected face image is directed to the front side. The face image detection module 221 outputs the information indicative of the detected face image to the clustering module 222.

The clustering module 222 subjects the detected face image to a clustering process, thereby classifying the detected face image on a person-by-person basis. Face images having similar face image features are recognized as the face images of the same person. Based on the result of the clustering process, the clustering module 222 allocates identification information (person ID) of the person to each face image. The same person ID is allocated to the face images of the same person. The clustering module 222 outputs the attribute of each face image (the smile degree, sharpness, frontality, person ID) to the index information generation module 224.

The event detection module 223 detects an event corresponding to the still image 51 which is an indexing target. The event detection module 223 classifies, for example, based on the date/time of generation (date/time of imaging) of the still image 51 of the indexing target, this still images 51 of the indexing target into the same event as other still images which were generated within a predetermined period (e.g. one day). The event detection module 223 allocates to the still images 51 of the indexing target the identification information (event ID) of the event to which the still image 51 of the indexing target has been classified. The event detection module 223 outputs the event ID, which has been allocated to the still image 51 of the indexing target, to the index information generation module 224.

The index information generation module 224 generates index information, based on the processing results by the face image detection module 221 and clustering module 222.

FIG. 4 shows a structure example of the index information 302A. The index information 302A includes a plurality of entries corresponding to the still images 51. Each entry includes an image ID, a date/time of generation (date/time of imaging), a location of generation (location of imaging), an event ID, a smile degree, a number of persons, and face image information. In the entry corresponding to a certain still image, the image ID is indicative of identification information which is unique to the still image. The date/time of generation is indicative of the date/time (date/time of imaging) at which the still image was generated. The location of generation is indicative of the location (position) where the still image was generated (captured). For example, information, which is added to the still image data, is used for the date/time of generation and the location of generation. The location of generation is indicative of, for example, position information which is detected by a GPS receiver when the still image data is generated (e.g. when the photo corresponding to the still image data is taken). The event ID is indicative of identification information which is uniquely allocated to the event corresponding to the still image. The smile degree is indicative of information which is determined by totalizing the smile degrees of persons included in the still image. The number of persons is indicative of the total number of face images included in the still image. The face image information is recognition result information of face images included in the still image. The face image information includes, for example, a face image (e.g. a path indicating the location of storage of the face image), person ID, position, size, smile degree, sharpness and frontality. When a plurality of face images are included in one still image 51, the index information 302A corresponding to the one still image 51 includes face image information corresponding to each of the face images.

The index information generation module 224 stores the generated index information 302A in the material information database 302.

By the above-described structure, the indexing module 22 can generate the index information 302A corresponding to the still image 51 that is input, and can store the generated index information 302A in the material information database 302.

The playback control module 23 extracts, based on the index information 302A, still images which are relevant to a selected still image (key image) from the still images 51 in the material database 301, and creates and plays back a photo movie or slide show by using the relevant still images.

The playback control module 23 comprises, for example, a style select module 230, a key image select module 231, a calendar display module 232, a relevant image select module 233, a scenario creation module 234, a moving picture generation module 235, and a moving picture playback module 236.

The style select module 230 selects one of a plurality of styles which are prepared in advance. The style select module 230 selects, for example, a style which is designated by the user via a style select screen. In addition, when a specific style is not designated by the user, the style select module 230 discriminates the features of a plurality of still images which are used for the display of the moving picture, and selects a style corresponding to the features.

The key image select module 231 selects a key image (key still image) from still images 51 stored in the material database 301. The key image select module 231 may also determine a still image, which is included in a moving picture (photo movie or slide show) that is being displayed, to be the key image. Specifically, when an image in a photo movie or slide show, which is being played back, is designated, the key image select module 231 determines the designated image to be the key image. If a key image is not designated by the user while the photo movie or slide show is being played back, the key image select module 231 may determine the last still image, which is included in the played-back photo movie or slide show, to be the key image.

The key image select module 231 may select a key image by using a calendar screen in which the dates of creation (imaging) of still images 51 are positively indicated on a calendar. The key image select module 231 determines, for example, the still image 51, which was created on the date designated by the user from the calendar screen, to be the key image.

Further, the key image select module 231 may determine, for example, a face image, which is selected by the user, to be a key face image. In this case, a still image relevant to a person corresponding to the key face image is extracted from the material database 301, and still images including the extracted still image are used for the creation of the moving picture (photo movie or slide show).

The relevant image select module 233 selects (extracts), from the still images 51 stored in the material database 301, still images meeting either or both of the conditions of one or more still images (still images) relevant to the key image (key face image) and one or more still images (still images) corresponding to the style selected by the style select module 230. The still image relevant to the key image has relevance to the key image with respect to, e.g. the date/time, person or location. The still image corresponding to the style meets the image extraction condition (designated by the combination of the date/time, person or location) which is determined for each of the styles. The relevant image select module 233 extracts the still images relevant to the key image, for example, by using the index information 302A stored in the material information database 302. The relevant image select module 233 comprises a date/time relevant image select module 233A, a person relevant image select module 233B and a location relevant image select module 233C.

The date/time relevant image select module 233A selects (extracts), from the still images 51 stored in the material database 301, still images having the date/time of generation which is relevant to the date/time of generation of the key image. For example, based on the index information 302A, the date/time relevant image select module 233A selects (extracts) still images which are generated during the same period (the period designated by, e.g. a day, a month, a time of year, a season, or a year) as the date/time of generation of the key image. In addition, for example, based on the index information 302A, the date/time relevant image select module 233A selects (extracts) still images which are generated during the same day, the same week, the same month, etc. (e.g. the same day of the previous year, or the same month two years later) during a period different from the date/time of generation of the key image.

The person relevant image select module 233B selects (extracts) still images which are relevant to a key face image (a face image included in a key image), from the still images 51 stored in the material database 301. The still images relevant to the key face image include, for example, a still image including a face image of the same person as the key face image, and a still image including a face image of another person relevant to the person corresponding to the key face image. Other persons relevant to the person corresponding to the key face image include, for example, a person included in the same still image as the key face image.

The location relevant image select module 233C selects (extracts) still images which are generated at a location relevant to the location of generation of the key image, from the still images 51 stored in the material database 301.

The scenario creation module 234 determines a scenario of a moving picture that is to be created (e.g. photo movie). The scenario includes, for example, information (scenario information) indicative of effects which are respectively used in a plurality of chapters (time segments) in a moving picture sequence that is to be created, and attributes of still images. Specifically, the scenario creation module 234 selects effects and still image attributes with respect to each of time segments, which are called "chapters", in the scenario.

In the present embodiment, for example, 24 kinds of scenario information are stored in advance in an effect database 303 as scenario data 303B. The scenario creation module 234 determines one of the 24 kinds of scenario information to be a scenario which is used for the creation of the moving picture (e.g. photo movie).

The determination of the scenario may be executed according to the style selected by the user. In other words, the scenario information to be used is determined in accordance with the selected style. In the embodiment, for example, eight kinds of styles (Happy, Fantastic, Ceremonial, Cool, Travel, Party, Gallery, Biography) are prepared in advance. In addition, for example, three kinds of scenario information are prepared in advance in association with each of the styles. The scenario creation module 234 automatically selects an arbitrary one of the three kinds of scenario information corresponding to the style selected by the user, and determines the selected scenario information to be the scenario of the moving picture (e.g. photo movie) that is to be created. Accordingly, the scenario information including the effect and still image attribute corresponding to the style can be determined. Instead of the user selecting the style, the scenario creation module 234 may automatically select an arbitrary one of the eight kinds of styles. In this case, the style to be used may be determined, for example, based on the features of the still images extracted by the relevant image select module 233 (e.g. the number of appearing persons (the number of face images), the smile degree of the face image, etc.)

As described above, an arbitrary one of the three kinds of scenario information corresponding to the selected style is selected as a scenario of the moving picture (e.g. photo movie) that is to be created. It is possible to use, for example, a random number when this scenario is selected. Thereby, even if the same style is selected, photo movies can be created by using different scenarios at each time. The attribute of the still images, which are used for the creation of the photo movie, varies depending on the scenario that is used. Therefore, to change the scenario that is used may increase the possibility that unexpected still images are found and shown to the user.

Furthermore, the scenario creation module 234 determines music which is used for the creation of the photo movie. In the embodiment, a plurality of music are stored in the music database 304 as music data 304A. The scenario creation module 234 determines the music that is to be used, for example, in accordance with the selected style, or in accordance with the features (e.g. the number of appearing persons (the number of face images)) of the still images extracted by the relevant image select module 233. The music to be used may be designated by the user. In the music database 304, music set including a plurality of music is prepared in association with each of the styles. The music set includes music having features corresponding to the style. When the user adds music, the music is classified into any one of the styles, in accordance with the genre (rock, pops, etc.) of the music and the impression of the user, and the classified music is stored in the music database 304. The photo movie creation application program 202 may be provided with a function of analyzing the features of music, and the music that is added by the user may be analyzed. The photo movie creation application program 202 classifies the music into the music set of any one of the styles, in accordance with the result of analysis.

When the style is selected by the user, the relevant image select module 233 can select (extract) still images relating to the style from the still images 51 stored in the material database 301, in accordance with the image extraction condition which is set for each of the styles.

Based on the still images stored in the material database 301, the moving picture generation module 235 generates a photo movie or a slide show according to a display mode.

When the display mode is a photo movie, the moving picture generation module 235 creates a photo movie, based on the scenario information which is determined by the scenario creation module 234. In this case, the moving picture generation module 235 selects, from the still images extracted by the relevant image select module 233, at least one still image corresponding to the still image attribute of each chapter indicated by the scenario information. The moving picture generation module 235 creates the photo movie by allocating the at least one still image, which has been extracted, to each chapter.

When the display mode is a slide show, the moving picture generation module 235 extracts a still image that is a display target, for example, at random, from the still images extracted by the relevant image select module 233.

When the moving picture generation module 235 creates the slide show, the moving picture generation module 235 may use the scenario information, as in the case of the creation of the photo movie. In this case, the moving picture generation module 235 selects, from the still images extracted by the relevant image select module 233, at least one still image corresponding to the still image attribute of each chapter indicated by the scenario information. The moving picture generation module 235 creates the slide show by allocating the at least one still image, which has been extracted, to each chapter, that is, determines the still images to be used and the order of playback of the still images.

As regards the photo movie, the moving picture playback module 236 plays back the photo movie by applying the effect corresponding to each chapter, which is indicated by the scenario information, to the still image allocated to each chapter. As regards the slide show, the moving picture playback module 236 plays back the still images which are successively extracted by the moving picture creation module 235.

FIG. 5 shows an example of a main screen 40 which is displayed by the photo movie creation application program 202.

The main screen 40 includes, for example, a "style" button 401, a "music" button 402, a "protagonist" button 403, a "start" button 404, a movie playback screen 405, and a "calendar" button 406.

The movie playback screen 405 is a screen for displaying a generated photo movie or slide show. On the movie playback screen 405, the photo movie or slide show, which is generated by the playback control module 23 (moving picture generation module 235), is successively played back and displayed. FIG. 5 shows an example in which persons 40A to 40F appear on the photo movie or slide show, which is being played back.

If the photo movie creation application program 202 is started, the photo movie creation application program 202 starts playback of the slide show. When a timing has come to start the playback of the photo movie while the slide show is being played back, the playback control module 23 determines the last displayed still image of the slide show to be the key image, creates the photo movie based on this key image, and starts the playback of the photo movie in place of the slide show. If the playback of the photo movie ends, the playback control module 23 determines the last displayed still image of the photo movie to be the key image, creates the slide show based on this key image, and starts the playback of the slide show.

When the movie playback screen 405 has been clicked by the user's operation of the pointing device while the photo movie or slide show is being displayed, the photo movie creation application program 202 pauses the playback of the photo movie (slide show) and determines the image, which is currently played back, to be the key image. If the image, which is being displayed, is an image which is created by combining a plurality of still images, the photo movie creation application program 202 may determine one of these still images to be the key image. Needless to say, one of the plural still images, which has been clicked by the user, may be determined to be the key image.

The "protagonist" button 403 is a button for starting the selection of a person of interest (protagonist) in the generated photo movie (or slide show). Responding to the pressing of the "protagonist" button 403, the key image select module 231 displays a list of persons appearing in the key image (face image select screen). For example, after selecting the key image by using the movie playback screen 405, the user presses the "protagonist" button 403 and instructs the start of the selection of the key face image (i.e. the display of the face image select screen).

FIG. 6 shows an example of a face image select screen 41 for selecting a key face image. The face image select screen 41 displays a list of face images (face images 41A to 41D) included in a key image. The key image select module 231 selects, from the persons 40A to 40F appearing in the key image, for example, persons (e.g. persons 40A to 40D) who appear in still images the number of which is a threshold value or more, and displays the face images 41A to 41D corresponding to the selected persons on the movie playback screen 405.

Using the face image select screen 41, the user selects the face image (face image 41A in this example) of the person of interest from among the face images 41A to 41D. The key image select module 231 determines the selected face image 41A to be the key face image (protagonist). The number of face images to be selected may be plural. When an operation of selecting a face image with use of the face image select screen 41 is not performed (e.g. when the "protagonist" button 403 is not pressed), the key image select module 231 may select, from among the face images included in the key image, a key image, which meets a predetermined condition, to be the key face image.

The "style" button 401 on the main screen 40 of FIG. 5 is a button for starting the selection of the style of the photo movie. Responding to the pressing of the "style" button 401, the photo movie creation program 202 displays a style select screen.

Figure 7:
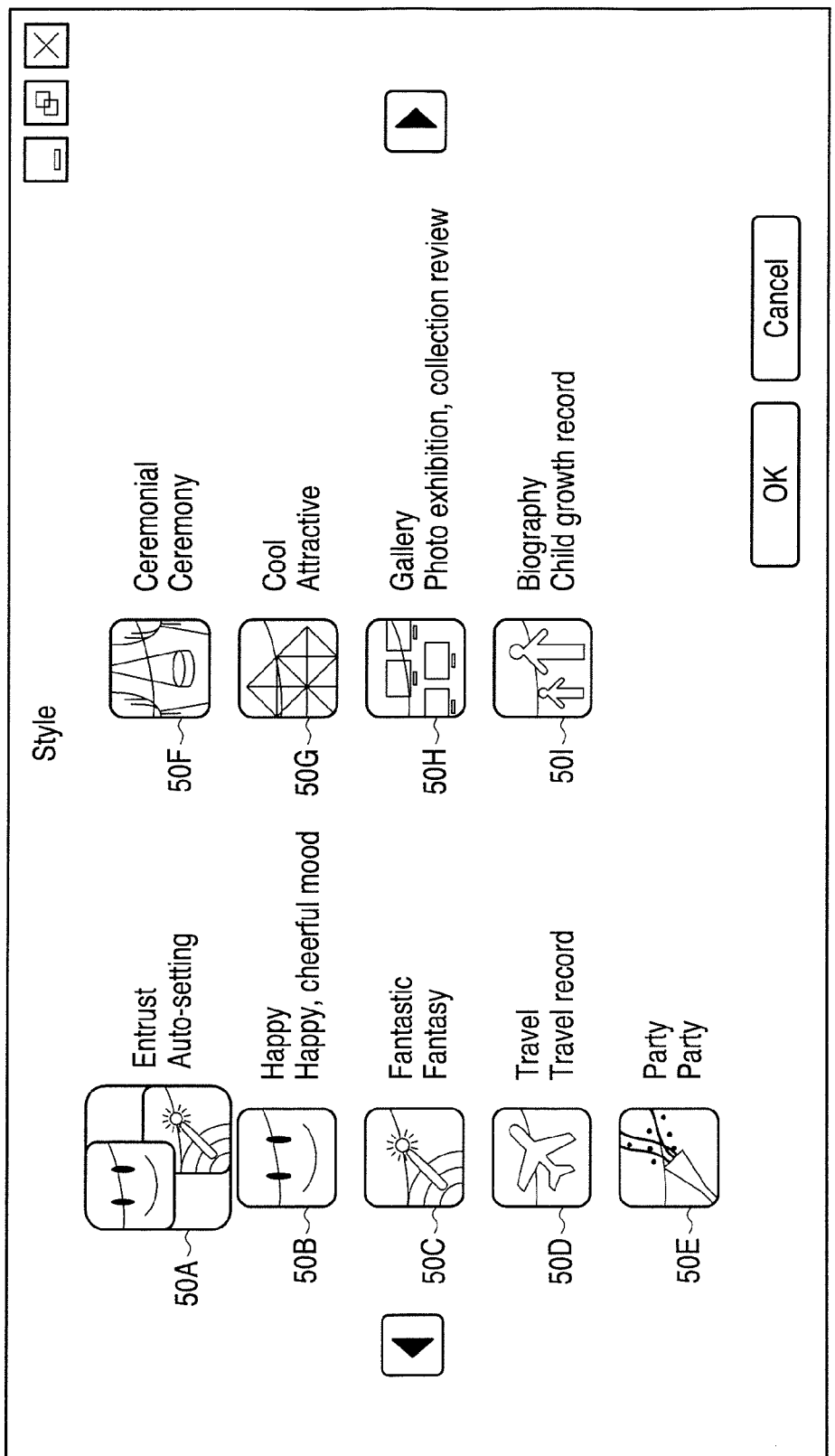
FIG. 7 is an exemplary view showing an example of a style select screen which is displayed by the electronic apparatus of the embodiment.

FIG. 7 shows an example of the style select screen. The style select screen displays, in addition to an "Entrust" button 50A, a plurality of buttons 50B to 50I corresponding to the above-described eight kinds of styles (Happy, Fantastic, Ceremonial, Cool, Travel, Party, Gallery, Biography). The user can designate the style by selecting a desired button. By designating the "Entrust" button 50A, the style corresponding to the features of the still images, which are used for displaying the moving picture, is automatically selected.

The "music" button 402 is a button for starting the selection of the music which is used for the photo movie. Responding to the pressing of the "music" button 402, the photo movie creation application program 202 displays the list of music (music select screen). The user can select a desired music.

The "start" button 404 is a button for starting generation and playback of the photo movie. Responding to the pressing of the "start" button 404, the photo movie creation application program 202 starts the creation of the photo movie. Then, the photo movie creation application program 202 plays back the created photo movie, and displays the photo movie on the movie playback screen 405.

Figure 8:
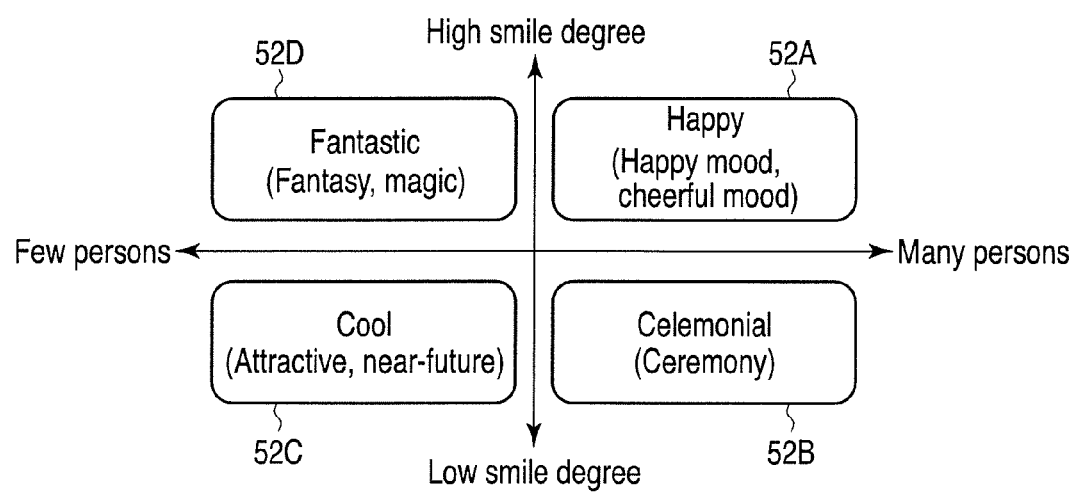
FIG. 8 is an exemplary view showing an example of the relationship between styles and image features in the embodiment.

FIG. 8 shows an example of the relationship between the styles and the image features.

For example, a still image, in which the number of persons is large and the smile degree is high, tends to call to mind a happy impression or a cheerful impression. Thus, when the style "Happy" is selected, the possibility is high that still images in which the number of persons is large and the smile degree is high are used for playing back the moving picture. A still image, in which the number of persons is large and the smile degree is low, tends to call to mind a ceremony. Thus, when the style "Ceremonial" is selected, the possibility is high that still images in which the number of persons is large and the smile degree is low are used for playing back the moving picture. A still image, in which the number of persons is small and the smile degree is low, tends to call to mind a cool impression or a near-future impression. Thus, when the style "Cool" is selected, the possibility is high that still images in which the number of persons is small and the smile degree is low are used for playing back the moving picture. A still image, in which the number of persons is small and the smile degree is high, tends to call to mind a fantasy or a magic. Thus, when the style "Fantastic" is selected, the possibility is high that still images in which the number of persons is small and the smile degree is high are used for playing back the moving picture.

Figure 9:
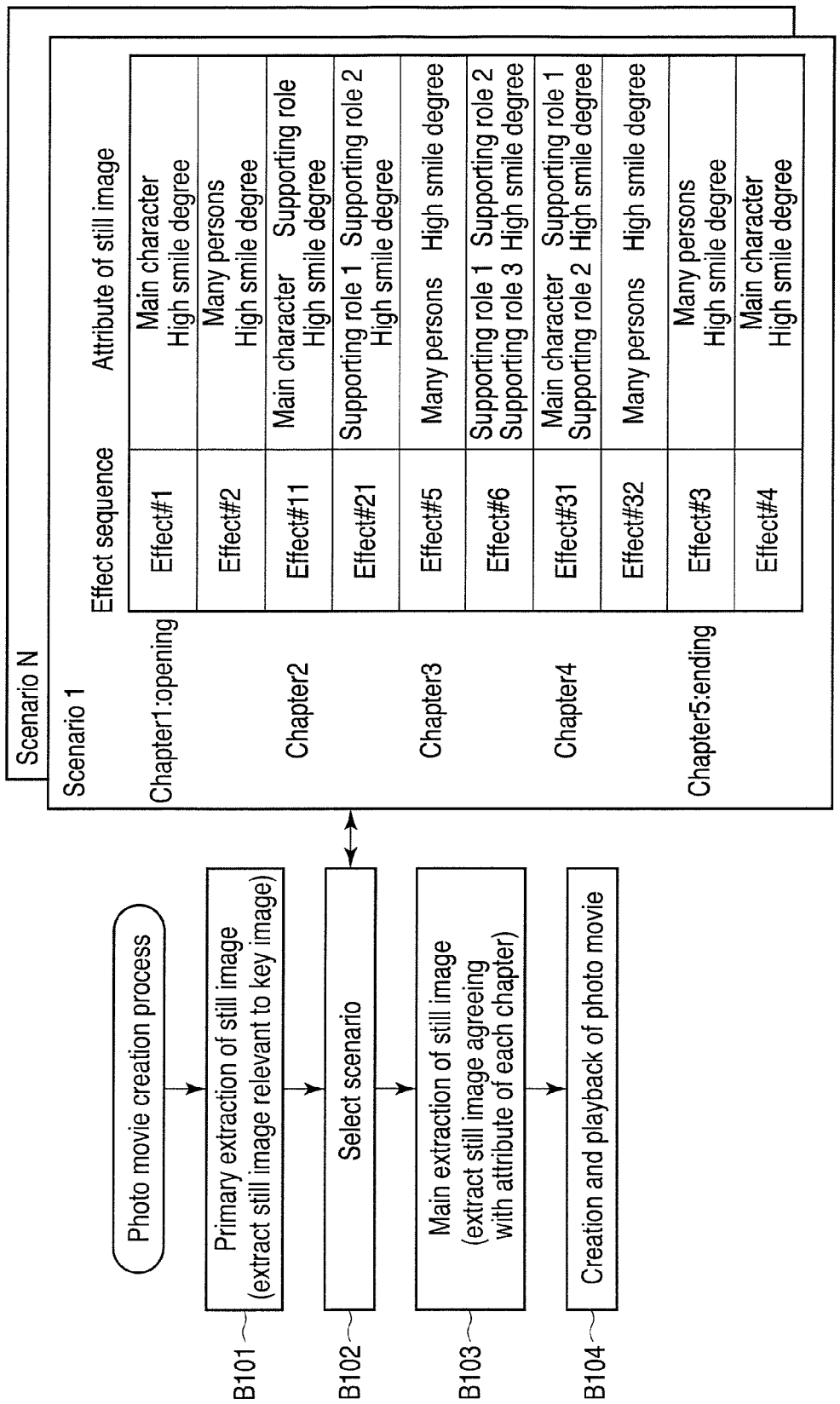
FIG. 9 is an exemplary conceptual view showing an example of a photo movie creation process which is executed by the electronic apparatus of the embodiment.

Next, referring to FIG. 9, the outline of the procedure of a photo movie creation process is described.

To start with, based on the index information, the photo movie creation application program 202 extracts (primary extraction) still images 51, which are relevant to a key image (key face image), and still images, which meet the image extraction condition corresponding to the style, from the material database 301 (block B101).

Then, the photo movie creation application program 202 selects a scenario which is used for the creation of a photo movie (block B102). In block B102, the photo movie creation application program 202 selects one of a plurality of scenario information items which are prepared in advance, in accordance with the selected style or characteristic values of the still images extracted in block B101. Each scenario information item specifies the order of effects (effect sequence) which is used in a plurality of chapters (scenes) constituting the sequence of the photo movie, the attributes of still images (still image attributes) and music.

In FIG. 9, it is assumed that the sequence of the photo movie comprises five chapters (chapters 1, 2, 3, 4 and 5). Chapter 1 is an opening scene of the photo movie, and chapter 5 is an ending scene of the photo movie. One or more effects are defined in each chapter, and still image attributes are defined in association with each effect.

As the still image attributes, use may be made of, for example, person attributes (face attributes). For example, a protagonist (leading role), a supporting role, a smile degree, sharpness, and the number of appearing persons may be used as the person attributes. The term "leading role" refers to a person who is to become the protagonist of the photo movie, that is, a person (face) of interest. For example, the person corresponding to the above-described key face image may be determined to be the leading role. The term "supporting role" refers to another person relevant to the protagonist. For example, a person (face) with a high frequency of co-occurrence with the protagonist may be determined to be the supporting role. The person attribute may designate a plurality of supporting roles. A plurality of persons (faces) with a high frequency of co-occurrence with the protagonist may be determined to be the supporting roles.

In addition, attributes corresponding to styles are used as the still image attributes. For example, in the scenario corresponding to the style "Happy", since this scenario calls to mind a happy impression or a cheerful impression, the still image attribute is set so that many still images in which the number of persons is large or the smile degree is high may be selected.

Not only the person attributes but also location attributes may be used as the still image attributes. The location attribute designates the location of imaging of still images which are used.

In scenario information 1 in FIG. 9, for example, two effects (Effect #1, Effect #2) are stipulated in chapter 1, and still image attributes "Protagonist, High smile degree" are associated with Effect #1, and still image attributes "Many persons, High smile degree" are associated with Effect #2. The still image attribute "Protagonist" designates that a still image in which the protagonist appears should be used. The still image attribute "Many persons" designates that the number of persons included in a still image is a preset threshold value or more. Some other examples of the still image attributes are as follows.

Still image attributes "Protagonist, Supporting role, High smile degree", which are associated with Effect #11 of Chapter 2, designate that use should be made of a still image in which both the protagonist and supporting role appear and the smile degree is high. Still image attributes "Supporting role 1, Supporting role 2, Supporting role 3, High smile degree", which are associated with Effect #6 of Chapter 3, designate that use should be made of a still image in which all three supporting roles (supporting role 1, supporting role 2 and supporting role 3) appear and the smile degree is high. Still image attributes "Many persons, High smile degree", which are associated with Effect #3 of Chapter 5, designate that use should be made of a still image in which a number of persons, which is a threshold value of more, appear and the smile degree is high. Still image attributes "Protagonist, High smile degree", which are associated with Effect #4 of Chapter 5, designate that use should be made of a still image in which the protagonist appears and the smile degree of the protagonist is a threshold value or more. In this manner, by the still image attributes, still images corresponding to the style can be designated and allocated to each chapter.

Subsequently, the photo movie creation application program 202 further extracts (main extraction) one or more still images, which correspond to the still image attributes of each chapter indicated by the selected scenario information, from the still images extracted in block 101 (block B103). The photo movie creation application program 202 creates a photo movie by allocating the extracted still images to each chapter, and plays back the created photo movie (block B104). In block B104, the photo movie creation application program 202 applies the effect corresponding to each chapter, which is indicated by the scenario information, to the still images allocated to each chapter.

In the effect sequence which is set in the scenario information, effects corresponding to the styles are prepared. Specifically, the effects are designed so as to give impressions corresponding to styles to the user, by varying the color, shape, movement (motion), object, etc. Thus, for example, when the style "Happy" is selected, an effect using, e.g. a light color or a vivid color is set so as to call to mind a happy impression or a cheerful impression. For example, when the style "Cool" is selected, an effect using, e.g. a geometrical shape is set so as to call to mind a cool impression or a near-future impression.

Although not shown in FIG. 9, the scenario information includes music attributes indicative of music which are played back in parallel with the playback of the moving picture. The music attribute designates a music set corresponding to the style. For example, the style "Happy" is selected, some of music included in the music set corresponding to the style "Happy" are selected, for example, at random, and are allocated.

Next, referring to a flow chart of FIG. 10, a style select process is described.

If the "style" button 401 on the main screen 40 is pressed, the style select module 230 of the photo movie creation application program 202 starts the style select process and causes the style select screen to be displayed (block B111). If the user designates one of the buttons 50A to 501 on the style select screen shown in FIG. 7 (block B112), the style select module 230 determines whether the "Entrust" button 50A has been designated or not.

If one of the buttons 50B to 501 corresponding to the styles (Happy, Fantastic, Ceremonial, Cool, Travel, Party, Gallery, Biography) is designated (No in block B113), the style select module 230 determines a condition for extracting still images (image extraction condition) in accordance with the selected style (block B115). The details of the image extraction conditions for the respective styles will be described later.

On the other hand, if the "Entrust" button 50A has been designated (Yes in block B113), the style select module 230 determines, based on the index information 302A, the features of still images which are stored in the material database 301 and become material candidates of a moving picture. The style select module 230 selects one of the styles in accordance with the features of the still images (block B114).

In another style select method in the case where the "Entrust" has been selected, still images relevant to the key image may be extracted and the style may be selected, based on the features of these still images. In this method, compared to the use of all still images registered in the material database, the style, in which the features of the key image are more strongly reflected, can be selected.

For example, when the ratio of still images, in which the smile degree is a threshold value or more, is a preset ratio or more (i.e. when the number of photos with smiles is large), the style "Happy" is selected. When the ratio of still images with consecutive dates of generation is a preset ratio or more (i.e. when the number of images, which were taken on consecutive dates, is large), the style "Travel" is selected. When the ratio of still images with the same date of generation, in which the number of persons is a threshold value or more, is a preset ratio or more (i.e. the number of images showing faces is large), the style "Party" is selected.

The style select method according to the features of still images is not limited to the above-described examples, and various determination conditions may be set for the respective styles.

If the style select module 230 selects the style according to the features of still images, the style select module 230 determines the condition for extracting still images (image extraction condition) in accordance with the selected style (block B115).

FIG. 11 shows examples of the image extraction condition corresponding to the style selected by the style select module 230.

For example, for the style "Happy", conditions "High smile degree" and "Many persons" are set so that images which call to mind a happy impression or a cheerful impression may be extracted. For the style "Party", conditions "Same date of generation" and "Many persons" are set. For the style "Travel", conditions "Consecutive dates of generation" and "Different locations of generation" are set.

In accordance with the respective styles, the conditions for extracting still images corresponding to the styles are set. One or more image extraction conditions are set for one style. By combining a plurality of conditions, still images suited to the style can be extracted with a higher possibility.

Hence, for example, by the extraction according to the image extraction conditions, it is possible to extract still images which are used for playback of moving pictures, such as a "set of still images captured on the same day" (Party), "set of still images with dates of imaging over two or more years" (Biography, Gallery), "set of still images comprising only photos including a specific person" (Biography), "set of still images including a person with high relevance to a specific person" (Travel, Party), "set of still images including many smiles" (Happy), and "set of still images captured over consecutive days" (Travel).

Figure 12:
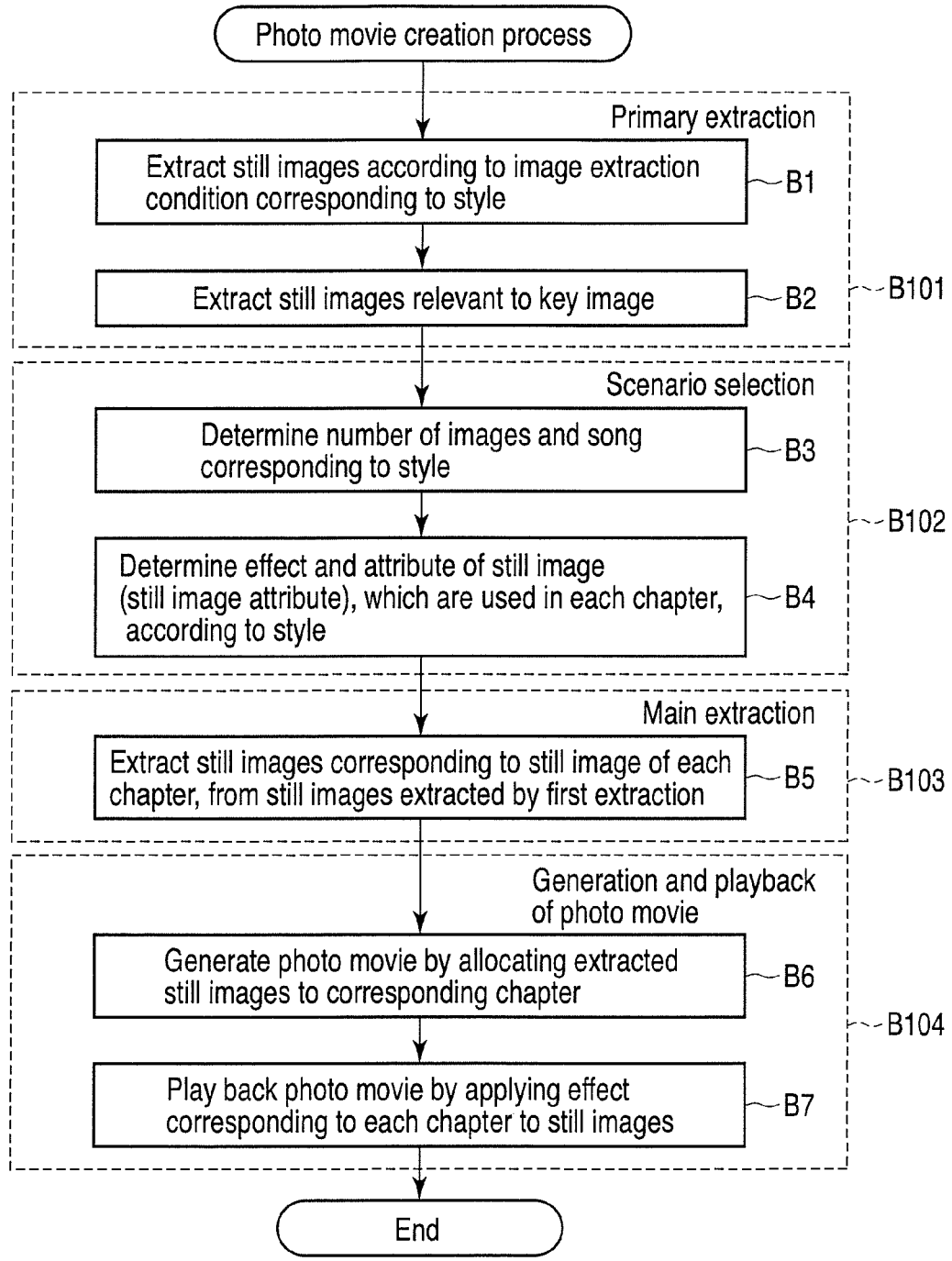
FIG. 12 is an exemplary flowchart illustrating the procedure of a photo movie creation process which is executed by the electronic apparatus of the embodiment.

Next, referring to a flowchart of FIG. 12, an example of the procedure of a photo movie creation process is described.

Responding to the pressing of the "start" button 404, the photo movie creation application program 202 starts the following photo movie creation process.

To start with, based on the index information, the relevant image select module 233 of the photo movie creation application program 202 extracts still images which meet the image extraction condition determined by the style select process (block B1). In addition, based on the index information, the relevant image select module 233 extracts still images relevant to a key image which is selected by the key image select module 231 (block B2). For example, by the person relevant image select module 233B, the relevant image select module 233 extracts, from the still images 51 stored in the material database 301, still images in which the face image of a person (protagonist) included in the key image appears, still images in which another person relevant to the protagonist appears, and other still images in an event (event group) to which the key image belongs.

By the process of blocks B1 and B2, the primary extraction process in block B101 in FIG. 9 is executed.

In another configuration of block B101, it is possible to extract images which meet both the image extraction condition according to the style and the condition that such images are relevant to the key image.

Subsequently, the scenario determination module 234 of the photo movie creation application program 202 determines scenario information corresponding to the style selected by the style select module 230. Specifically, the scenario determination module 234 determines the number of images and music which are used for playback of the moving picture (block B3) and determines the effect and still image attributes, which are used in each chapter, in accordance with the style (block B4). As regards the number of images, a plurality of number sets are prepared for each style. One of the number sets may be selected at random or may be determined in accordance with the length of music.

Then, the moving picture generation module 235 extracts still images, which correspond to the still image attributes of each chapter (person attribute, location attribute, etc.), from the still images extracted by the primary extraction (block B5). Since the conditions corresponding to the styles are set for the still image attributes, still images corresponding to the style are extracted with respect to each chapter. For example, when the style "Happy" is selected, still images with a high smile degree are extracted.

Subsequently, the moving picture playback module 236 creates a photo movie by allocating the extracted still images to each chapter (block B6). The moving picture playback module 236 plays back the photo movie by applying the effect corresponding to each chapter, which is indicated by the scenario information, to the still images allocated to each chapter (block B7).

FIG. 13 shows examples of effects which are set in scenario information of respective styles.

In the scenario information, effects which are unique to the respective styles and effects which are usable in any of the styles can be defined.

For example, when the style "Happy" is selected, an effect of adding a floral design using a light color or vivid color to images is applied. As regards music, music of a light tune is selected. When the style "Party" is selected, a showy effect, such as a floral-design outer frame or a 9-multi-screen, is used. As regards music, music of a light tune is selected. When the style "Biography" is selected, a period effect such as displaying the entire screen in sepia color, is used. As regards music, music of a slow tempo is selected. When the style "Travel" is selected, an effect of simultaneous display of many images, such as a film roll, or an effect of successive overlaying of photos, is used. As regards music, music of a slow tempo is used.

Besides, various effects according to the style may be used singly or in combination.

Figure 14:
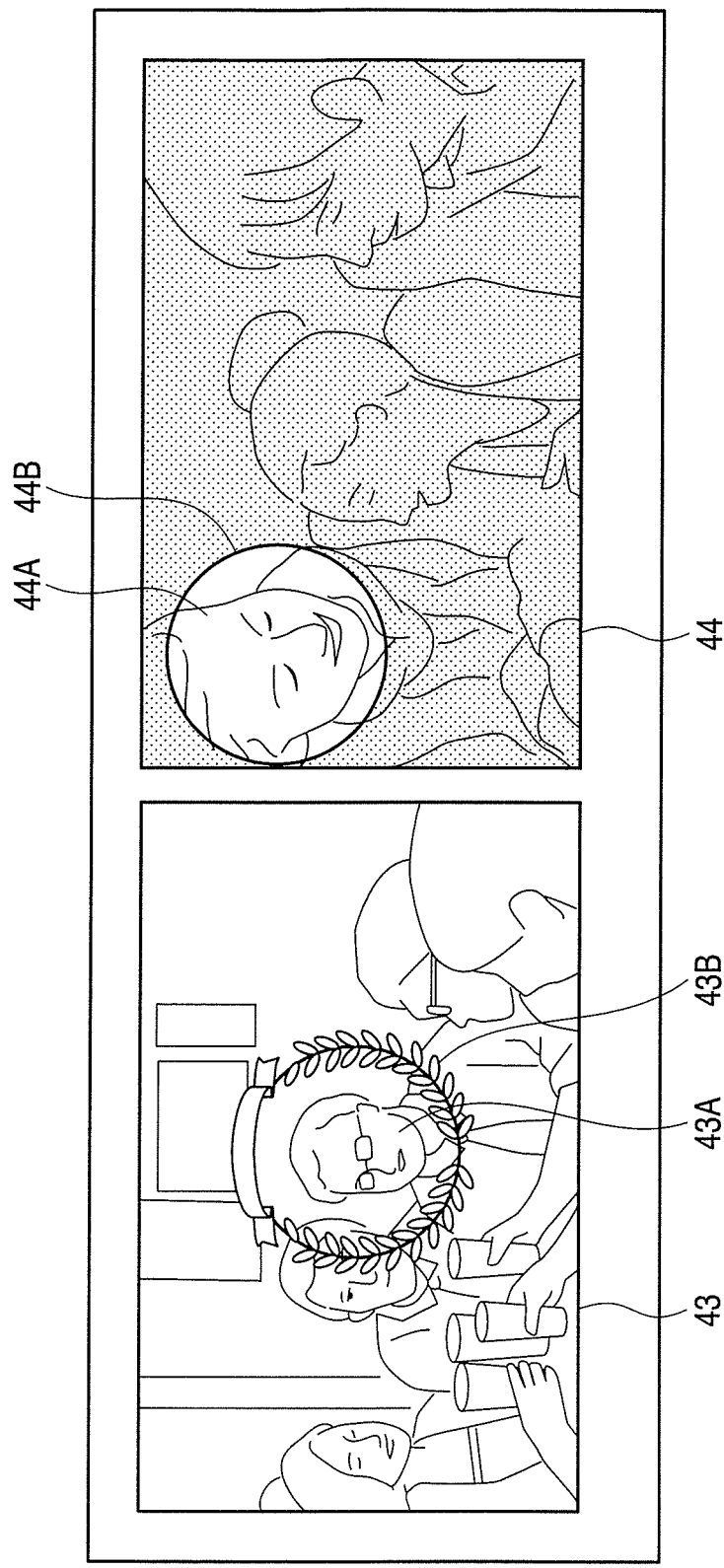
FIG. 14 is an exemplary view showing an example of a photo movie to which an effect has been applied, the photo movie being displayed by the electronic apparatus of the embodiment.
Figure 15:
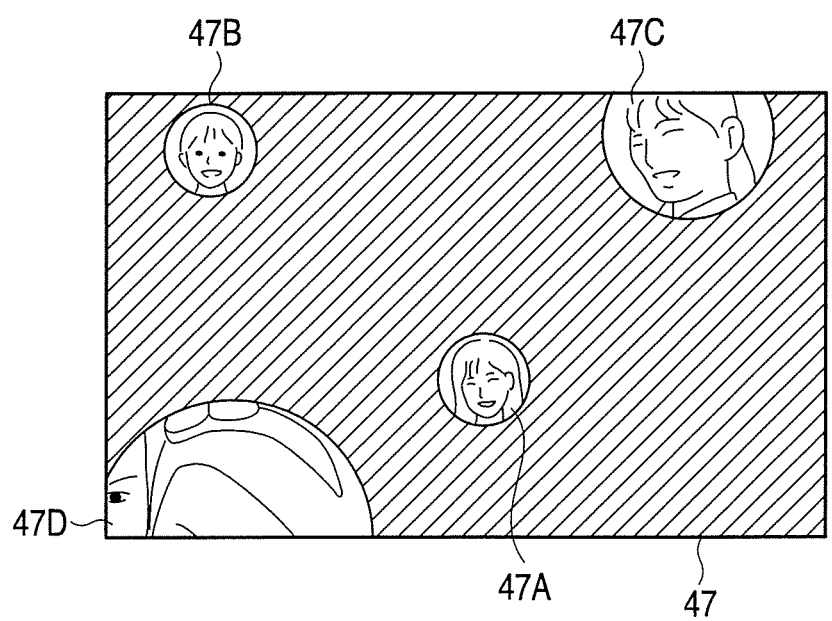
FIG. 15 is an exemplary view showing an example of a photo movie to which an effect has been applied, the photo movie being displayed by the electronic apparatus of the embodiment.

FIG. 14 and FIG. 15 show examples of display of the photo movie to which the effect has been applied.

FIG. 14 shows an example of the photo movie in the case where the style "Party" is selected. Still images including many persons are used. On a screen 43, an effect 43B for emphasizing a person 43A is applied to the face image of the person 43A who is the protagonist. The effect 43B superimposes an illustration, which surrounds the face image, on the face image. On a screen 44, an effect 44B, which puts a spot on a person 44A, is applied to the face image of the person 44A. The effect 44B darkens the region other than the face image of the person 44A.

FIG. 15 shows an example of the photo movie in the case where the style "Happy" is selected. Still images with a high smile degree are used. On a screen 47, face images 47A to 47D with a high smile degree are cut out of still images, and are displayed. On the screen 47, in order to express a cheerful mood, the display positions of the face images 47A to 47D are varied in a lively way.

In the present embodiment, the scenario information designating the effect sequence and the still image attributes, which are used when the photo movie is created, have been described by way of example. When the slide show is created, use may be made of scenario information which designates only the attributes of still images to be used. In addition, when the slide show is created, a transition to be used may be designated in place of the effect to be used.

All the procedures of the playback process in this embodiment may be executed by software. Thus, the same advantageous effects as with the present embodiment can easily be obtained simply by installing a program, which executes the procedures of the playback process, into an ordinary computer through a computer-readable storage medium which stores the program, and executing this program.

The functions of the respective components shown in FIG. 3 may be realized by hardware such as a purpose-specific LSI or a DSP.

As has been described above, in the photo movie creation application program 202 of the embodiment, by making the user designate the style, the moving picture, which includes unexpected still images, etc. and satisfies the demand by the user, can be presented to the user.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
   an indexing module configured to generate index information indicative of attributes of a plurality of still images;
   an image select module configured to select a first still image as a key image from the plurality of still images;
   a select module configured to select a style;
   a first image extraction module configured to extract a first still image group from the plurality of still images based on the index information, the first still image group being associated with the first still image and comprising an attribute which satisfies a condition corresponding to the style selected by the select module, and a condition based on relevance with the first still image;
   a display module configured to display a moving picture on a screen by using the first still image group; and
   an input module configured to input an instruction to select part of the moving picture displayed on the screen while the moving picture is being displayed by the display module,
   wherein the image select module is configured to newly select, as the key image, a still image corresponding to the part of the moving picture, so that the first image extraction module and the display module respectively perform extraction of a still image group included in the first still image group and associated with a still image corresponding to the part of the moving picture, and display of the moving picture, in accordance with the instruction input through the input module.

2. The electronic apparatus of claim 1, further comprising:
   a scenario creation module configured to create scenario information indicative of an attribute of still images which are used in a plurality of time segments, in accordance with the style; and
   a moving picture creation module configured to extract at least one still image corresponding to the attribute with respect to each of the plurality of time segments from the first still image group, and to create a moving picture by allocating the at least one still image to each of the plurality of time segments,
   wherein the display module is configured to play back the moving picture.

3. The electronic apparatus of claim 2, wherein the scenario creation module is configured to create scenario information comprising information indicative of the effect corresponding to the style in each of the plurality of time segments, and
   the display module is configured to display the moving picture by applying the effect to the at least one still images allocated to the time segments, in accordance with the information indicative of the effect.

4. The electronic apparatus of claim 1, further comprising a characteristic discrimination module configured to discriminate characteristics of the plurality of still images, based on the index information,
   wherein the select module is configured to select the style according to the characteristics.

5. The electronic apparatus of claim 1, further comprising:
   a second image extraction module configured to extract a second still image group which is associated with the still image; and
   a characteristic discrimination module configured to discriminate characteristics of the second still image group,
   wherein the select module is configured to select the style according to the characteristics.

6. An image processing method comprising:
   generating index information indicative of attributes of a plurality of still images;
   selecting a first still image as a key image from the plurality of still images;
   selecting a style;
   extracting a first still image group from the plurality of still images based on the index information, the first still image group being associated with the first still image and comprising an attribute which satisfies a condition corresponding to the style, and a condition based on relevance with the first still image;
   displaying a moving picture on a screen by using the first still image group; and
   newly selecting, as the key image, a still image corresponding to the part of the moving picture, so that the first image extraction module and the display module respectively perform extraction of a still image group included in the first still image group and associated with a still image corresponding to the part of the moving picture, and display of the moving picture, in accordance with the instruction input through the input module.

7. The method of claim 6, further comprising:
   creating scenario information indicative of an attribute of still images which are used in a plurality of time segments, in accordance with the style;
   extracting at least one still image corresponding to the attribute with respect to each of the plurality of time segments from the first still image group;
   creating a moving picture by allocating the at least one still image to each of the plurality of time segments; and
   displaying the moving picture.

8. The method of claim 7, further comprising:
   creating scenario information comprising information indicative of the effect corresponding to the style in each of the plurality of time segments; and
   displaying the moving picture by applying the effect to the still images allocated to the time segments in accordance with the information indicative of the effect.

9. The method of claim 6, further comprising;
   discriminating characteristics of the plurality of still images, based on the index information; and
   selecting the style according to the characteristics.

10. The method of claim 6, further comprising:
    extracting a second still image group which is associated with the first still image;

discriminating characteristics of the second still image group; and selecting the style according to the characteristics.

11. A non-transitory computer readable medium having stored thereon a computer program which is executable by a computer, the computer program controlling the computer to execute functions of:

generating index information indicative of attributes of a plurality of still images;

selecting a first still image as a key image from the plurality of still images;

selecting a style;

extracting a first still image group from the plurality of still images based on the index information, the first still image group being associated with the first still image and comprising an attribute which satisfies a condition corresponding to the style, and a condition based on relevance with the first still image;

displaying a moving picture on a screen by using the first still image group;

inputting an instruction to select part of the moving picture displayed on the screen; and newly selecting, as the key image, a still image corresponding to the part of the moving picture, so that the first image extraction module and the display module respectively perform extraction of a still image group included in the first still image group and associated with a still image corresponding to the part of the moving picture, and display of the moving picture, in accordance with the instruction input through the input module.

* * * * *